March 2, 1954  C. R. BOOTHBY ET AL  2,670,492
ELECTRIC WINDSHIELD WIPER
Filed March 3, 1948  2 Sheets-Sheet 2

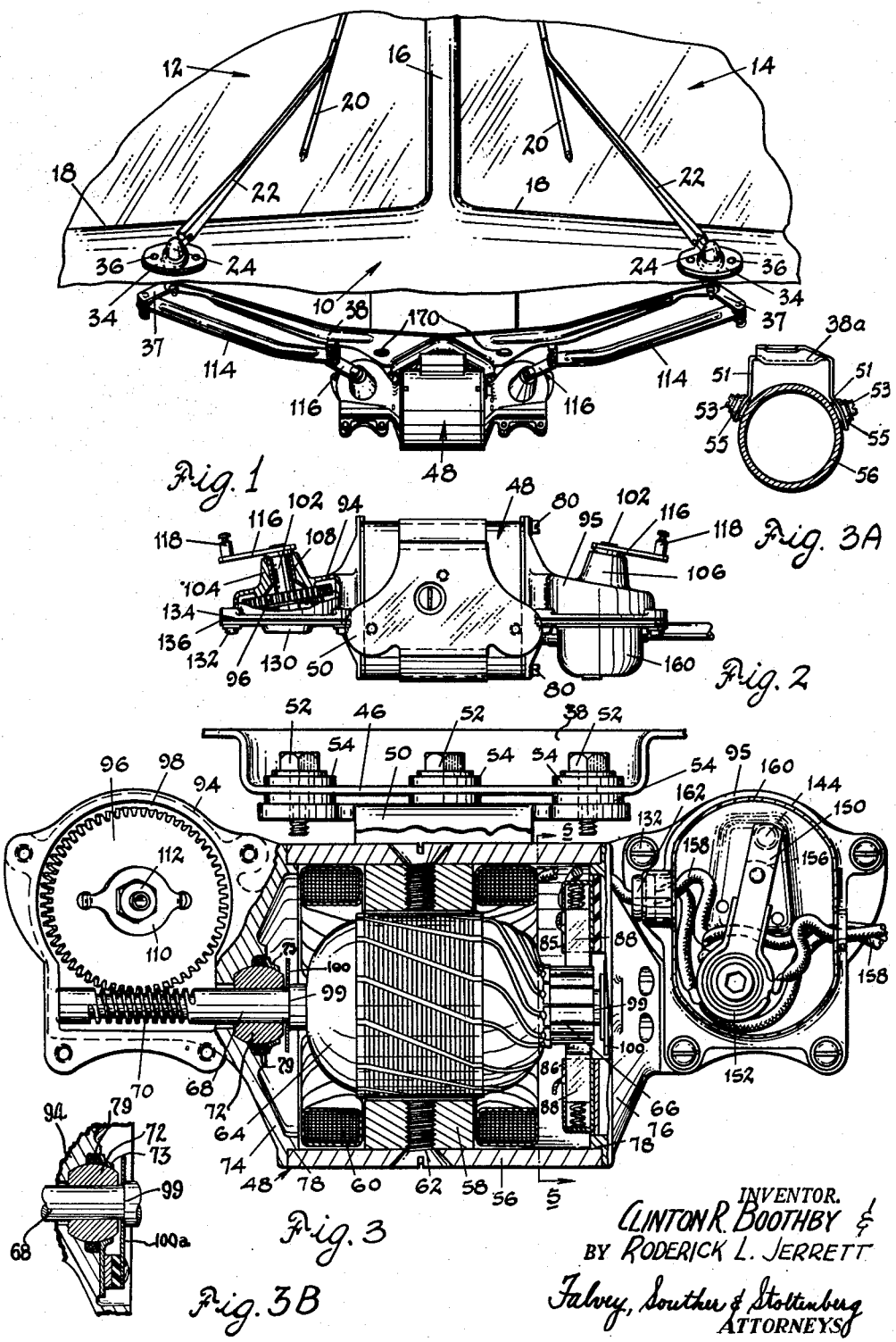

INVENTOR.
CLINTON R. BOOTHBY &
BY RODERICK L. JERRETT
Falvey, Southee & Stottenburg
ATTORNEYS Patented Mar. 2, 1954

2,670,492

UNITED STATES PATENT OFFICE 2,670,492

ELECTRIC WINDSHIELD WIPER

Clinton R. Boothby and Roderick L. Jerrett, Toledo, Ohio

Application March 3, 1948, Serial No. 12,875

8 Claims. (Cl. 15—253)

This invention relates to a dual windshield wiper, particularly to windshield wipers driven by an electric motor positioned between the wipers.

This invention contemplates the provision of an electrically-operated windshield wiper wherein the electric motor is positioned between the wipers in such a manner as to reduce losses due to mechanical friction to a minimum to thereby substantially increase the efficiency of the mechanism. This is accomplished by utilizing a motion-translating device at each end of the armature shaft of the electric motor in such a manner that the friction components are reduced by creating a balanced relation between the end thrusts active on the ends of the armature shaft arising from the transmission of power through the translating devices.

The invention further contemplates the provision of a dual windshield wiper system wherein the tolerances allowable during manufacture of the device, are reflected equally in the movements of each of the separate wiper blades to give an uniform arc of movement to each. Furthermore, due to the fact that the driving mechanisms are positioned at the respective ends of the armature shaft for each of the wipers, it becomes possible to reduce the length of the driving links to a minimum, which substantially enhances the stiffness of these members and, at the same time, reduces the amount of material utilized in fabricating the wiper mechanism.

The invention further contemplates the provision of a dual windshield wiper which is readily adaptable to be fabricated as a sub-assembly and suitable for attachment to an automobile as a unit in a mass production line. It is further contemplated to provide a mechanism which is suitable for mass production, so as to be reliable and cheap and yet easy to fabricate.

It is, therefore, a principal object of this invention to provide a dual windshield wiper mechanism in which the individual wipers are driven from opposite ends of a motor which is positioned between the wipers.

It is a further object of this invention to provide a dual windshield wiper mechanism which has improved efficiency by reducing frictional losses arising from end thrust in the bearings by balancing from opposite ends of the motor shaft the end thrust arising from the translating devices driving the separate wipers.

It is a further object of this invention to provide a dual windshield wiper system which is suitable for use on an angularly-arranged windshield having a pair of sections, with the arc of movement of each of the blades on the sections substantially the same.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view of a windshield wiper incorporating the invention as positioned on an automobile;

Fig. 2 is a plan view of the electric motor;

Fig. 3 is an elevational view, partly in section, of the electric motor including translating devices;

Fig. 3A is an elevational view of a modification of the mounting means;

Fig. 3B is a sectional plan view of a bearing detail.

Figures 8, 9:
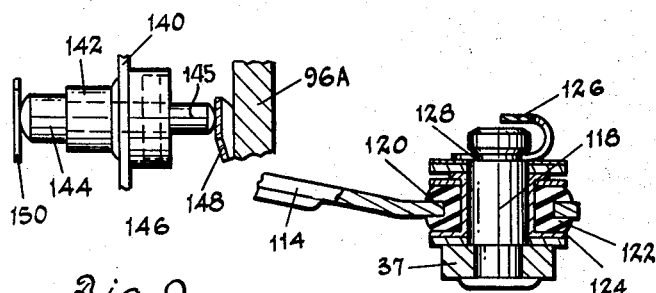
Fig. 8 is an elevational view, in section, taken along line 8—8 of Fig. 7.
Fig. 9 is an elevational view, partly in section, of a detail of the switch mechanism.

Referring now to the drawings, particularly to Fig. 1, an automobile body 10 is shown provided with a pair of angularly-disposed windshield sections 12 and 14, which cooperate with each other by being fixed in body strut 16, and each having a lower edge 18, fixed in the body member 10. Each of the windshield sections 12 and 14 is provided with a wiper blade 20, which is pivotally attached to the terminus of an arm 22, which is rotatably attached to a pivot 24 to move in a plane normal to their respective windshield sections under the bias of a spring 26 (Fig. 7) anchored on the pivot 24. The pivot is attached to a shaft 28 by means of screw 29, the shaft being normal to the plane of the glass of its respective windshield section, and journaled in a bearing member 30, extending through an aperture 32 in the wall of the body 10 to the inside of the vehicle. The bearing member 30 is fixed to the body 10 by means of a face-plate 34 positioned on the exterior of the body 10 and clamped in operative position by screws 36 threaded through apertures in the body into the bearing member 30. As the shaft 28 is rotated by means of a crank 37 attached thereto at its inner end and cooperating with a motor means, hereinafter to be described, the pivot 24, the arm 22 and the blade 20 move in an arc over the surface of the glass of its respective windshield, the arc subtending an angle of approximately 100° having its center at the pivot. This construction may vary considerably and is well known in the art and need not be described in further detail.

The position of the pivot with reference to its cooperating windshield section is such that the blade 20, as oscillated by the arm 22, may sweep an angle of approximately 100° over the glass as measured from the bottom edge 18 thereof, against which the blade 20 is adapted to rest when in parked position, being mounted in an angular relation with the arm 22 for this purpose when the arm extends outward relative to the body strut 16. The arms 22 are arranged, so that they oscillate in the same direction with reference to each other, namely, will move inwardly toward the strut 16 together and move outwardly together. The extreme outward position is the parked position, which is obtained by a cooperating mechanism which will be described hereinafter.

Figure 7:
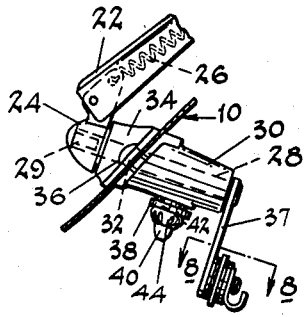
Fig. 7 is an elevational view of one of the pivots for the wiper arms.

For convenient use on a mass production line, the pivot bearing members 30 are held in spaced relation to cooperate with spaced apertures 32 in the body member 10 by means of a bracket 38 (Fig. 1), to which the bearing members are attached by means of integral studs 40 fitted through apertures 42 in the ends of the bracket (Fig. 7). Spring clamping means 44 are provided to hold the parts in assembled relation by gripping the end of the studs 40. Adjacent a central location, the bracket 38 is provided with an offset portion 46, to which is attached an electric motor 48 by a stirrup 50, which is resiliently mounted on the portion 46 by bolts 52, extending through rubber grommets 54 and threading into the stirrup 50. The resilient mounting tends to reduce transmission of motor noises to the bracket and possibly to the body member 10, to which the bracket is attached to hold the complete sub-assembly in position on the automotive vehicle.

The stirrup 50 for the electric motor 48 is preferably attached to a field member 56 by welding or the like, the field member being provided with pole shoes 58 cooperating with field coils 60 in a well known manner. The pole shoes 58 are attached to the field member 56 by means of screws 62. In Fig. 3A, a modification of the stirrup 50 is shown, wherein the embracing member 51 is made integral with the bracket 38a and attached to the motor field member 56 by screws 53, which cooperate with soft rubber grommets 55 fitted into apertures in the terminal portions of the embracing member 51. Better sound insulation is obtained by using this mounting.

Cooperating with the pole shoes, is an armature 64 having the usual commutator 66 and an elongated shaft 68 extending the same distance from each end of the armature, being provided at each end with a worm 70 integrally formed therein. The armature shaft is journaled in self-aligning bearings 72 positioned centrally by holders 73 in a pair of end heads 74 and 76 fitted into the ends of the cylindrical field member 56, and centered therein by a shoulder 78 fitting snugly into the field member. Oiling wicks 79 are provided for the bearings.

Figure 6:
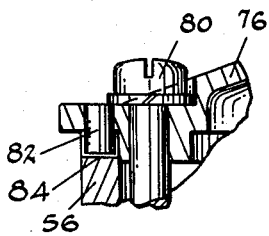
Fig. 6 is a plan view, in section, of an indexing device for the motor end heads.

A pair of bolts 80 (Fig. 2) are provided to draw up the end heads on the field member by extending longitudinally thereof and being threaded into the end head 74. Indexing means, comprising pins 82, fitted on each end head, are provided to cooperate with slots 84 on each end of the field member, being preferably located adjacent one of the bolts 80, as is best shown in Fig. 6. The indexing means predetermines the angular relation between the end heads by locating from the cooperating field member.

The inner side of the end head 76 is provided with a pair of brush holders 85 and 86 to house spring-biased brushes 88 which cooperate with the commutator 66 in a well known manner, it being unnecessary to describe them in further detail. Brush holder 85 is attached to and insulated by a fiber plate 90 attached to the end head 76 by rivets 92, while brush holder 86 is grounded to the end head as shown.

Figure 5:
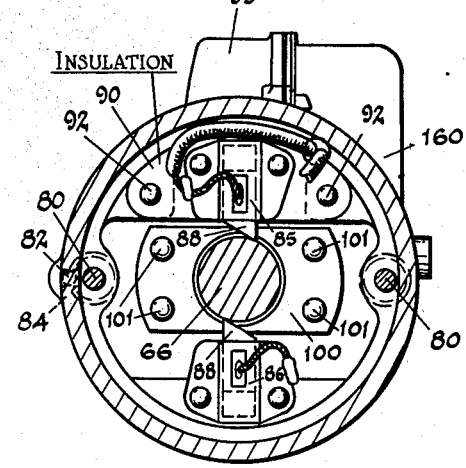
Fig. 5 is an elevational view, in section, taken along line 5—5 of Fig. 3.

Each of the end heads 74 and 76 is provided with an integral housing 94 and 95 for housing a gear 96 in its cavity 98 to cooperate with the worms 70 on the ends of the armature shaft 68, which is adapted to extend into the cavity 98 thereof. The armature shaft is provided with a pair of shoulders 99 which are adapted to cooperate with spring members 100 (Figs. 3 and 5) which provide a resilient end thrust thereto and are attached to the ends heads 94 and 95 by rivets 101. The springs 100 are slightly deflected to bear against the shoulders 99 to prevent excessive endwise movement of the shaft and prevent noisy bumping should the forces acting against the shaft become unbalanced. The normal end thrust on the shaft arising from the cooperative relation of the gears 96 with their worms 70 is balanced and tend to counteract each other. Referring to Fig. 3, the thrust of the gear on the left side of the motor tends to move the shaft to the right, while the thrust of the gear on the right side of the motor tends to move the shaft to the left, so that these thrusts, being opposed, will balance each other and thereby reduce the friction losses in the motion-transmitting devices. The overall efficiency of the windshield wiper is materially enhanced thereby.

In Fig. 3B, a modification of the spring 100 is shown comprising a cantilever spring 100a which resiliently bears against shoulders 99 to prevent bumping, being attached to the end heads by riveting, the same rivet also attaching the bearing holder 73.

The gears 96 are rotatively mounted in the cavities 98 of the housings 94 and 95 by short shafts 102, journaled in hollow bosses 104 and 106 integral with the housings 94 and 95, being provided with bearing bushings 108 of the porous, oil-absorbent type. The gears are fixed to the shafts by dogs 110 held on by nuts 112 threaded on the shaft.

Referring to Fig. 2, it will be noted that the shafts 102 are mounted in angular relation with the axis of the motor shaft 68, to likewise hold the gears 96 in oblique angular relation with the worms 70. This oblique angular relation is predetermined by the angular relation between the windshield sections 12 and 14 (Fig. 1) with which the pivot shaft 28 cooperates in a normal relation to oscillate the blades 20 over their surfaces through the agency of arms 22. The shafts 102 are positioned in parallel relation with the shafts 28 of the pivots 24 serving the separate windshield sections 12 and 14, in order that links 114 which connect the arms 37 of the pivot shaft 28 may move in a plane when actuated by arms 116 fixedly mounted on the shafts 102. Studs 118 are riveted into the ends of the arms 37 and 116 respectively as is shown in Fig. 8, and extend through an enlarged aperture 120 in the ends of the links 114, being provided with a rubber grommet 122 seating a bearing bushing 124 fitted to the stud. The assembly is locked by a spring clip 126 fitting into an annular slot 128 in the stud.

Figure 4:
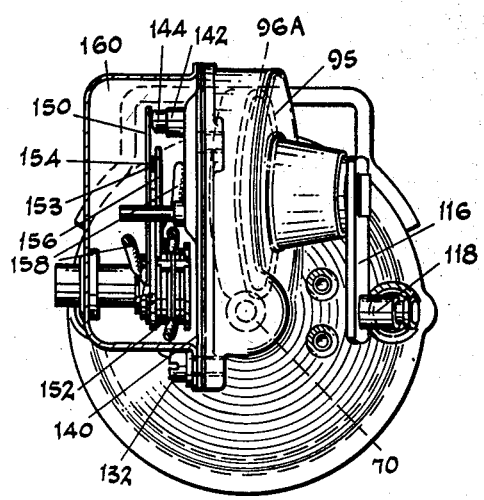
Fig. 4 is an elevational end view, partly in section, taken from the right of Fig. 3.

Returning now to the housings 94 and 95, their cavities 98, in which the gears 96 and their cooperating worms 70 are mounted, are closed by covers 130 fitted by screws 132 to the open face 134 of the housing, being provided with gasket 136 to hold grease in the cavities 98 for lubricating the moving parts. Similar covers may be provided for each housing if desired. If, however, a motor-parking-switch is to be provided, it is conveniently mounted on one of these covers, as is shown in Fig. 4.

Should the parking switch be desirable, it is mounted on a special cover plate 140, which is pierced by a flanged aperture 142, in which is mounted a headed push button 144 of insulating material. The head of the push button 146 is positioned exteriorly of the plate 140 and its stem 145 extends into the cavity 98 of the housing 95 and cooperates with a cam rise 148 positioned on the forward face of the gear 96A, as seen in Fig. 9. The push button 144 is thrust toward the gear by leaf spring 150, mounted in an insulated pile 152 on the plate 140. The leaf spring 150 is provided with a contact 153, cooperating with a second contact 154 adjustably mounted on the end of a shorter leaf spring 156, also mounted in the insulated pile 152. When the cam rise 148 thrusts the push button 144 outwardly, it will disengage the two contacts 153 and 154 to open the motor circuit and park the wiper arms 22 at a predetermined position, preferably when parallel to the bottom edge 18 of the windshield sections 12 and 14.

Conductors 158 are provided to complete the circuits from the switching mechanism to the motor. An outer cover 160 is provided to house the switching mechanism, being held in position by screws 132 already described. Conductors 158 enter the cover 160 by a rubber insulating grommet 162 and enter the motor casing in a similar manner, as is well known in the art.

Figure 10:
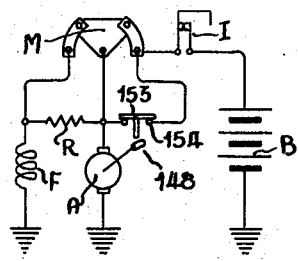
Fig. 10 is a schematic diagram of connections.

In the schematic diagram of connections shown in Fig. 10, a source of electrical energy B is connected to the ignition switch I, thence to parallel circuits having in one branch a manual control switch M and in the other branch the cam-operated switch cooperating with the motor including contacts 153 and 154, both parallel circuits leading to the field F and armature of the motor as shown. A resistance R may be provided if desired. The source B, the armature A, and the field F are all grounded as shown to complete the circuits. From the circuit, it is clear that the manual switch M controls the operating circuits of the motor. When, however, the manual switch M is opened, the cam-operated switch, including contacts 153 and 154, maintain the operating circuit closed until opened by the cam 148 which will be in timed relation with the movement of the arms 22 when they are in "parking" position. If "parking" is not desired, the manual switch M is used alone.

For assembly on a motor vehicle, the bracket 38 has assembled thereon the motor at a central location and the two pivot shafts engaging the ends of the arms, the assembly being then placed as a unit under the dash with the bearing housings 30 and their shafts 28 extending through apertures 32 in the cowl. The bracket is then attached to the frame of the vehicle by bolts positioned through apertures 170 (Fig. 1) and the plates 34 are attached to the bearing housings by screws 36 which hold them in position on the cowl. Thereafter the arms 22 with blades 20 are attached to the shafts 28 by screws 29 in their proper angular relation to give the prescribed sweep over the glass of their cooperating sections. This provides a convenient assembly means particularly adapted to mass production lines.

It is to be understood that the above detailed description of the present invention is intended to disclose an embodiment to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a windshield wiper, an assembly adapted to be applied as a unit to an angularly arranged or curved windshield of an automotive vehicle, comprising an attachment bracket with a pair of laterally extending arms, motor means including a unitary rotary shaft attached to the bracket between the arms, pivot means for the wiper attached to the ends of the arms and held in angular relation normal to the adjacent sections of the windshield, crank means on each of the pivot means, links connected to each of the crank means extending toward the motor, and motion translating means including gears cooperating with each link in the plane of movement of the pivot arms, said gears being rotatably affixed, one to each end of the motor casing, said shaft of the motor means being positioned between the motion translating means and cooperating therewith at each of its ends by means of an integral worm engaging the respective gears at an oblique angle, the relation between the gears and worms being such that the end thrust of the worms on the driving shaft during driving relation counteract and balance each other.

2. In a driving means for a dual windshield wiper for use with sections of a non-planar windshield, an electric motor comprising a tubular field member and a rotatable armature including a unitary rotary shaft mounted therein, end heads for the field member including journal means for the ends of the armature shaft, integral worms positioned on each of the ends of the armature shaft adjacent the end heads, reduction gears cooperating with each worm journaled in a portion of the end heads at a predetermined oblique relation with the axis of the armature shaft related to the sections of the non-planar windshield, crank means cooperating with each of the gears to rotate therewith under the action of the worms, the reduction gears and the worms being arranged so that the end thrust on the respective worms counteract and balance each other during the driving relation, resilient means to cushion the end thrust of the armature shaft, and means to hold the end heads in position on the field member in predetermined relation.

3. In a driving means for a dual windshield wiper cooperating with sections of a non-planar windshield, an electric motor comprising a tubular field member and a rotatable armature including a unitary shaft mounted therein, end heads for the field member including journal means for the ends of the armature shaft, guide means to predetermine the angular position of the end heads with relation to the field member, worms affixed on each of the ends of the armature shaft adjacent the journal means, reduction gears housed and journaled in integral portions of the end heads and cooperating with each worm at a predetermined oblique relation with the axis of the armature shaft related to the sections of the non-planar windshield, crank means cooperating with each of the gears to rotate therewith under the action of the worms, the reduction gears and the worms being arranged so that the end thrust on the respective worms counter and balance each other during the driving relation, and means to hold the end heads in position on the field member.

4. In a driving means for dual windshield wiper cooperating with sections of a non-planar windshield, an electric motor comprising a tubular field member and a rotatable armature including a one-piece shaft mounted therein, end heads for the field member including journal means for the ends of the armature shaft, worms affixed on each of the ends of the armature shaft adjacent the journal means, reduction gears cooperating with each worm journaled in a portion of the end heads at a predetermined oblique relation with the axis of the armature shaft to obtain a parallel relation to said windshield sections, housing means for the gears at least in part integral with the end heads, crank means cooperating with each of the gears to rotate therewith under the driving action of the worms, the reduction gears and the worms being arranged so that the end thrust on the respective worms counteract and balance each other during the driving relation, and means to hold the end heads in position on the field member in predetermined relation.

5. In a driving means for a dual windshield wiper cooperating with sections of a non-planar windshield, an electric motor comprising a tubular field member and a rotatable armature including a one-piece shaft mounted therein, said motor being in circuit with a source of power, end heads for the field member including journal means for the ends of the armature shaft, worms in spaced relation affixed on each of the ends of the armature shaft, adjacent the outside of the end heads reduction gears cooperating with each worm at the ends of the shaft, said gears being journaled in a portion of the end heads at a predetermined oblique relation with the axis of the armature to establish a parallel driving relation with the sections of the windshield, crank means cooperating with each of the gears to rotate therewith under the action of the worms, the reduction gears and the worms being arranged so that the end thrust on the respective worms on the shaft counteract and balance each other during the driving relation to thereby substantially reduce friction losses in the motor, switch means on one of the end heads for parking the crank means at a predetermined position by breaking the motor power circuit, cam means cooperating with one of the gears to actuate the switch means, and means to hold the end heads in position on the field member in predetermined relation.

6. In a driving means for a dual windshield wiper for a non-planar windshield, an electric motor comprising a tubular field member and a rotatable armature including a one-piece shaft mounted therein extending a short distance from the tubular member, end heads for the field member including journal means for the ends of the armature shaft, bracket means for mounting the motor including pivots for the windshield wipers, worms integrally positioned on each of the ends of the armature shaft adjacent the outer side of the end heads, reduction gears cooperating with each worm journaled in a portion of the end heads at an oblique angular relation with the axis of the armature shaft, housings for the gears at least in part integral with the end heads, crank means cooperating with each of the gears to rotate therewith in the plane of a portion of the non-planar windshield under the driving action of the worms, link means cooperating with the crank means to actuate the pivots, the reduction gears and the worms being arranged so that the end thrust on the shaft by the respective worms counteract and balance each other during the driving relation to substantially reduce friction loss, and means to hold the end heads in position on the field member in predetermined relation.

7. In a device of the class described, a unitary rotaryshaft of a motor provided with worms in spaced relation, longitudinally spaced worm gears in rotatably positioned oblique angular relation with each other and with the axis of the shaft to establish a driving connection with each of the worms to provide a speed reduction, the end thrust of the worms during driving relation balancing each other, and reciprocable driving means driven by each of the worm gears operable in diverging planes having a uniform angular relation with reference to the axis of the shaft.

8. In a driving means for a dual windshield wiper to clean portions of a non-planar windshield, a one-piece rotary shaft of a motor having worms at each end, a worm gear driven by each integral worm on the ends of the shaft, said gears being positioned obliquely with the axis of the worms and parallel to the planes of the windshield portions, the end thrust on said shaft by said worms during driving relation balancing each other, crank means driven by each worm gear, an oscillatable crankshaft for each windshield portion substantially normal thereto for driving a wiper blade thereover through the agency of an arm, and link means connecting the crank means and the crankshafts.

CLINTON R. BOOTHBY.
RODERICK L. JERRETT.

References Cited in the file of this patent
UNITED STATES PATENTS

| Number | Name | Date |
|---|---|---|
| 374,908 | Sellers | Dec. 13, 1887 |
| 1,806,336 | Critchfield | May 19, 1931 |
| 2,259,790 | Auten | Oct. 21, 1941 |
| 2,270,589 | Hansen | Jan. 20, 1942 |
| 2,329,895 | Hansen | Sept. 21, 1943 |
| 2,364,603 | Coxon | Dec. 12, 1944 |